US010284368B2

(12) United States Patent
Li et al.

(10) Patent No.: US 10,284,368 B2
(45) Date of Patent: May 7, 2019

(54) SECURE KEY STORAGE

(71) Applicant: Intel Corporation, Santa Clara, CA (US)

(72) Inventors: Jiangtao Li, Beaverton, OR (US); Anand Rajan, Beaverton, OR (US); Roel Maes, Geel (BE); Sanu K Mathew, Hillsboro, OR (US); Ram Krishnamurthy, Portland, OR (US); Ernie Brickell, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/399,568

(22) Filed: Jan. 5, 2017

(65) Prior Publication Data

US 2017/0126405 A1 May 4, 2017

Related U.S. Application Data

(62) Division of application No. 13/996,554, filed as application No. PCT/US2011/067881 on Dec. 29, 2011, now Pat. No. 9,544,141.

(51) Int. Cl.
| | |
|---|---|
| *H04L 29/06* | (2006.01) |
| *H04L 9/08* | (2006.01) |
| *G09C 1/00* | (2006.01) |

(52) U.S. Cl.
CPC .............. *H04L 9/0891* (2013.01); *G09C 1/00* (2013.01); *H04L 9/0822* (2013.01);
(Continued)

(58) Field of Classification Search
CPC ...................................................... G06F 21/72
See application file for complete search history.

(56) References Cited

U.S. PATENT DOCUMENTS

| | | |
|---|---|---|
| 5,799,080 A | 8/1998 | Padmanabhan et al. |
| 6,823,454 B1 | 11/2004 | Hind et al. |

(Continued)

FOREIGN PATENT DOCUMENTS

| | | |
|---|---|---|
| CN | 1961268 | 5/2007 |
| CN | 101251879 A | 8/2008 |

(Continued)

OTHER PUBLICATIONS

Armknecht et al., "A Formal Foundation for the Security Features of Physical Functions", IEEE Symposium on Security and Privacy (SSP), May 2011, pp. 397-412.

(Continued)

*Primary Examiner* — Jason K Gee
(74) *Attorney, Agent, or Firm* — Lowenstein Sandler LLP

(57) ABSTRACT

Some implementations disclosed herein provide techniques and arrangements for provisioning keys to integrated circuits/processor. In one embodiments, a key provisioner/tester apparatus may include a memory device to receive a unique hardware key generated by a first logic of a processor. The key provisioner/tester apparatus may further include a cipher device to permanently store an encrypted first key in nonvolatile memory of the processor, detect whether the stored encrypted first key is valid, and to isolate at least one of the first logic and the nonvolatile memory of the processor from all sources that are exterior to the processor in response to detecting that the stored encrypted first key is valid.

14 Claims, 10 Drawing Sheets

(52) U.S. Cl.
CPC .......... *H04L 9/0861* (2013.01); *H04L 9/0866* (2013.01); *H04L 9/0894* (2013.01); *H04L 2209/12* (2013.01)

(56) References Cited

U.S. PATENT DOCUMENTS

| | | | |
|---|---|---|---|
| 7,134,025 B1* | 11/2006 | Trimberger | G06F 12/1425 713/189 |
| 7,310,821 B2 | 12/2007 | Lee et al. | |
| 7,681,103 B2 | 3/2010 | Devadas et al. | |
| 7,757,083 B2 | 7/2010 | Devadas et al. | |
| 7,761,714 B2 | 7/2010 | Luzzi et al. | |
| 7,813,507 B2 | 10/2010 | Brickell et al. | |
| 7,818,569 B2 | 10/2010 | Devadas et al. | |
| 7,840,803 B2 | 11/2010 | Clarke et al. | |
| 7,904,731 B2 | 3/2011 | Devadas et al. | |
| 8,290,150 B2 | 10/2012 | Erhart et al. | |
| 8,386,801 B2 | 2/2013 | Devadas et al. | |
| 8,386,990 B1 | 2/2013 | Trimberger et al. | |
| 8,402,401 B2 | 3/2013 | Chakraborty et al. | |
| 8,525,549 B1 | 9/2013 | Feng et al. | |
| 2002/0129261 A1 | 9/2002 | Cromer et al. | |
| 2003/0177401 A1* | 9/2003 | Arnold | H04L 9/0863 713/155 |
| 2003/0204743 A1 | 10/2003 | Devadas et al. | |
| 2005/0010788 A1* | 1/2005 | Craft | G06F 21/123 713/187 |
| 2005/0022025 A1 | 1/2005 | Hug | |
| 2005/0039016 A1 | 2/2005 | Aissi et al. | |
| 2007/0183194 A1 | 8/2007 | Devadas et al. | |
| 2008/0005033 A1* | 1/2008 | Clark | G06F 21/121 705/59 |
| 2008/0106605 A1 | 5/2008 | Schrijen et al. | |
| 2008/0189559 A1 | 8/2008 | Delfs | |
| 2008/0216147 A1 | 9/2008 | Duffy | |
| 2008/0256600 A1 | 10/2008 | Schrijen et al. | |
| 2008/0279373 A1 | 11/2008 | Erhart et al. | |
| 2009/0006862 A1 | 1/2009 | Alkove et al. | |
| 2009/0080659 A1 | 3/2009 | Elder et al. | |
| 2009/0083833 A1 | 3/2009 | Ziola et al. | |
| 2009/0224323 A1 | 9/2009 | Im et al. | |
| 2010/0085075 A1 | 4/2010 | Luzzi et al. | |
| 2010/0122353 A1 | 5/2010 | Koushanfar et al. | |
| 2010/0127822 A1 | 5/2010 | Devadas | |
| 2010/0199103 A1 | 8/2010 | Van Rijnswou | |
| 2010/0250936 A1 | 9/2010 | Kusakawa et al. | |
| 2010/0275036 A1 | 10/2010 | Harada et al. | |
| 2010/0322418 A1 | 12/2010 | Potkonjak | |
| 2011/0055649 A1 | 3/2011 | Koushanfar et al. | |
| 2011/0055851 A1 | 3/2011 | Potkonjak et al. | |
| 2011/0191837 A1 | 8/2011 | Guajardo Merchan et al. | |
| 2011/0215829 A1 | 9/2011 | Guajardo Merchan et al. | |
| 2011/0239002 A1 | 9/2011 | Beckmann et al. | |
| 2011/0299678 A1* | 12/2011 | Deas | H04L 9/003 380/28 |
| 2012/0126840 A1 | 5/2012 | Lee et al. | |
| 2012/0131340 A1 | 5/2012 | Teuwen et al. | |
| 2012/0137137 A1 | 5/2012 | Brickell et al. | |
| 2012/0198243 A1 | 8/2012 | Matsushima et al. | |
| 2012/0204023 A1 | 8/2012 | Kuipers et al. | |
| 2012/0224695 A1 | 9/2012 | Hashimoto et al. | |
| 2012/0321077 A1 | 12/2012 | Shiota et al. | |
| 2012/0324310 A1 | 12/2012 | Oshida et al. | |
| 2013/0051552 A1 | 2/2013 | Handschuh et al. | |
| 2013/0141137 A1 | 6/2013 | Krutzik et al. | |
| 2013/0142329 A1 | 6/2013 | Bell et al. | |
| 2013/0147511 A1 | 6/2013 | Koeberl et al. | |
| 2013/0185611 A1 | 7/2013 | Goettfert et al. | |
| 2013/0194886 A1 | 8/2013 | Schrijen et al. | |
| 2013/0254636 A1 | 9/2013 | Kirkpatrick et al. | |
| 2014/0032933 A1 | 1/2014 | Smith et al. | |
| 2014/0089659 A1 | 3/2014 | Brickell et al. | |
| 2014/0089685 A1 | 3/2014 | Suzuki | |
| 2014/0091832 A1 | 4/2014 | Gotze et al. | |
| 2014/0093074 A1 | 4/2014 | Gotze et al. | |
| 2014/0095867 A1 | 4/2014 | Smith et al. | |
| 2014/0108786 A1 | 4/2014 | Kreft | |
| 2014/0189890 A1 | 7/2014 | Koeberl et al. | |
| 2014/0201540 A1 | 7/2014 | Li et al. | |
| 2014/0266297 A1 | 9/2014 | Mathew et al. | |

FOREIGN PATENT DOCUMENTS

| | | |
|---|---|---|
| CN | 102393890 A | 3/2012 |
| TW | 200405711 | 4/2004 |
| TW | 200849927 | 12/2008 |
| TW | 201141177 | 11/2011 |
| WO | 2000/072499 A1 | 11/2000 |
| WO | WO2013101085 | 7/2013 |
| WO | WO2014051741 | 4/2014 |
| WO | WO2014105310 | 7/2014 |

OTHER PUBLICATIONS

Bulens et al., "How to Strongly Link Data and its Medium: the Paper Case", IET Information Security, 2010, vol. 4, Issue 3, 12 Pages.

"Gassend et al., ""Silicon physical random functions"", In the proceedings of the Computer and Communication Security Conference, Nov. 2002, 15 Pages".

GS1 DATAMATRIX, "An Introduction and Technical Overview of the Most Advanced GS1 Identifiers Compliant Symbology", May 2014, 39 Pages, available at: <http://www.gs1.org/services/publications/online>.

Guajardo et al., "FPGA intrinsic PUFs and their use for IP protection", Cryptographic Hardware and Embedded Systems—CHES 2007, Lecture Notes in Computer Science, vol. 4727, 2007, pp. 63-80.

"Johnson et al., ""JTAG 101 IEEE 1149.x and Software Debug"", Intel JTAG 101, Jan. 2009, 26 Pages, available at:<http://www.intel.com/content/www/us/en/embedded/testing-and-validation/jtag-101-ieee-1149x-paper.html>".

Katzenbeisser et al., "Recyclable PUFs: Logically Reconfigurable PUFs", In Cryptology ePrint Archive, Report 2011/552, 2011, 15 Pages, available at: <https://eprint.iacr.org/2011/552.pdf>.

Koeberl et al., "A Practical Device Authentication Scheme using SRAM PUFs", Lecture Notes in Computer Science, vol. 6740, 2011, pp. 63-77.

Maes et al., "PUFKY: A Fully Functional PUF-based Cryptographic Key Generator", In Cryptographic Hardware and Embedded Systems—CHES, Lecture Notes in Computer Science, vol. 7428, 2012, 18 Pages.

"Martin, Deutschmann, ""Cryptographic Applications with Physically Unclonable Functions"", Master Thesis, Alpen-Adria-Universität Klagenfurt, Nov. 18, 2010, 102 Pages, available at<file:///C:/Users/kdutta/Downloads/Cryptographic%20Applications%20with%20Physically%20Unclonable%20Functions.pdf>".

National Institute of Standards and Technology (NIST), "Secure Hash Standard", Federal Information Processing Standards Publication 180-2, Aug. 1, 2002, 75 Pages.

Sanu et al., "Burn-in hardened Physically Unclonable-Function (PUF) circuits for PVT Variation-Tolerant ID/Keys", 2013.

Suh et al., "Physical Unclonable Functions for Device Authentication and Secret Key Generation", Proceedings of the 44th annual Design Automation Conference, 2007, pp. 9-14.

International Search Report and Written Opinion received for PCT Patent Application No. PCT/US2013/071346, dated Feb. 27, 2014, 14 Pages.

International Preliminary Report on Patentability and Written Opinion received for PCT Patent Application No. PCT/US2011/067881, dated Jul. 10, 2014, 6 Pages.

International Search Report received for PCT Patent Application No. PCT/US2013/045517, dated Jul. 18, 2014, 3 Pages.

International Search Report and Written Opinion received for PCT Patent Application No. PCT/US2011/067881 dated Feb. 25, 2012, 9 Pages.

* cited by examiner

US 10,284,368 B2

SECURE KEY STORAGE

RELATED APPLICATIONS

This application is a divisional of U.S. patent application Ser. No. 13/996,544, with a 371(c) date of Mar. 17, 2014, which is a National Stage Entry of PCT Application PCT/US11/67881, filed Dec. 29, 2011, the entire contents of both of which are hereby incorporated by reference herein.

TECHNICAL FIELD

Some embodiments of the invention generally relate to the manufacture of processors. More particularly, some embodiments of the invention relate to secure key management and provisioning, of keys to processors.

BACKGROUND ART

During manufacture, keys are provisioned to and stored in the integrated circuit or processor. The keys may be stored in fuses of the integrated circuits or processors and may be unique per type of integrated circuit or processor. The keys may be fed into and consumed by various security engines or co-processors.

Typically, the keys may be categorized as class 1 or class 2 keys. Class 1 keys include random secret keys that are shared with at least one entity such as a key generator. During manufacture of an integrated circuit or processor, the class 1 keys can be either auto-generated, by the integrated circuit or processor, stored therein, and revealed to at least one other entity or the class 1 keys may be externally generated, by a key generating entity, and stored in the integrated circuit or processor. Non-limiting examples of class 1 keys include provisioning keys, customer keys, and conditional access keys. Class 2 keys include secret keys derived from a master secret, which is unknown to the integrated circuit or processor but which is known to at least one entity such as a key generating entity. Unlike class 1 keys, class 2 keys cannot be auto-generated. Class 2 keys are generated, by a key generating entity, and stored, during manufacture, in the integrated circuit or processor. Non-limiting examples of class 2 keys include High-bandwidth Digital Content Protection (HDCP) keys, Enhanced Privacy Identifier (MD) keys, and Advanced Access Content System (AACS) keys.

Keys may be stored in non-volatile memory—having a special type of security fuses. Security fuses may have a number of security countermeasures in place that make them less susceptible than regular fuses to physical attacks. However, these security countermeasures make the security fuses more costly, in terms of die area, than regular fuses such as general-purpose high-density fuses.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Key Provisioning—and Testing Overview

Figure 1:
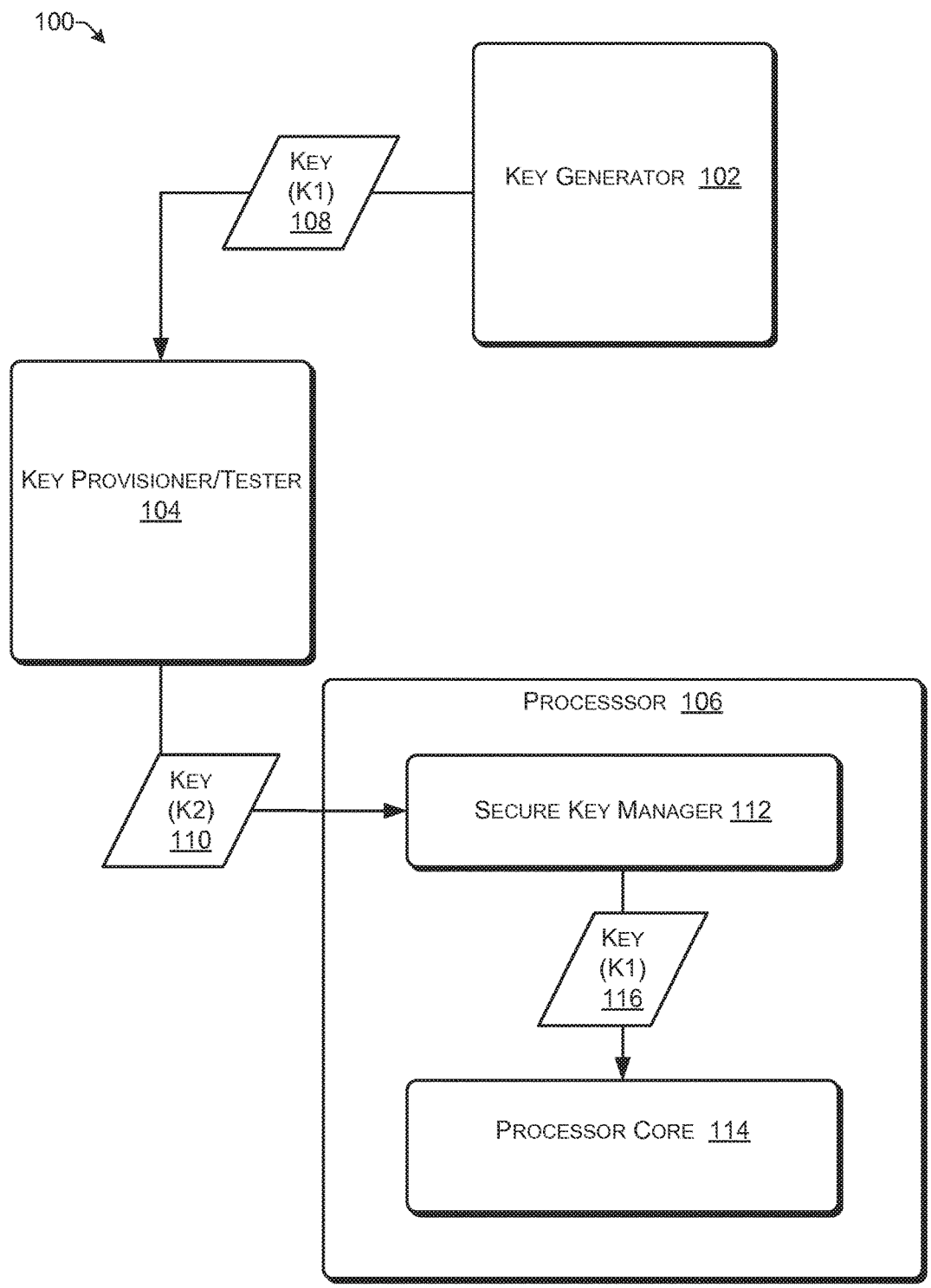
FIG. 1 illustrates an exemplary key-provisioning and testing environment for provisioning keys to processors according to some implementations.

FIG. 1 illustrates an exemplary key-provisioning and testing environment 100 for provisioning keys to processors. The key-provisioning and testing environment 100 may include a key generator 102, a key-provisioner/tester 104, and a processor 106. The key generator 102 may generate key(s) (K1) 108. The key (K1) 108 may be a shared secret type key (e.g., class 1 key and/or class 2 key).

The key-provisioner/tester 104 receives the key (K1) 108 from the key generator 1.02. The key-provisioner/tester 104 provides the processor 1.06 with key (K2) 110. In some instances, the key (K2) 110 may be the same as the key (KO 108. In other instances, the key (K2) 110 may be different from the key (KI) 108 but correspond to the key (K1) 108. For example, the key-provisioner/tester 104 may encrypt the key—(K1) 108 to generate the key—(K2) 110.

The processor 106 may include a secure key manager component 112 and a processor core 114. The secure key manager component 112 may provide the processor core 114 with key 116, where the key 116 may be the same, numerically and/or functionally, as the key (K1) 108.

External Key Encryption

Figure 2:
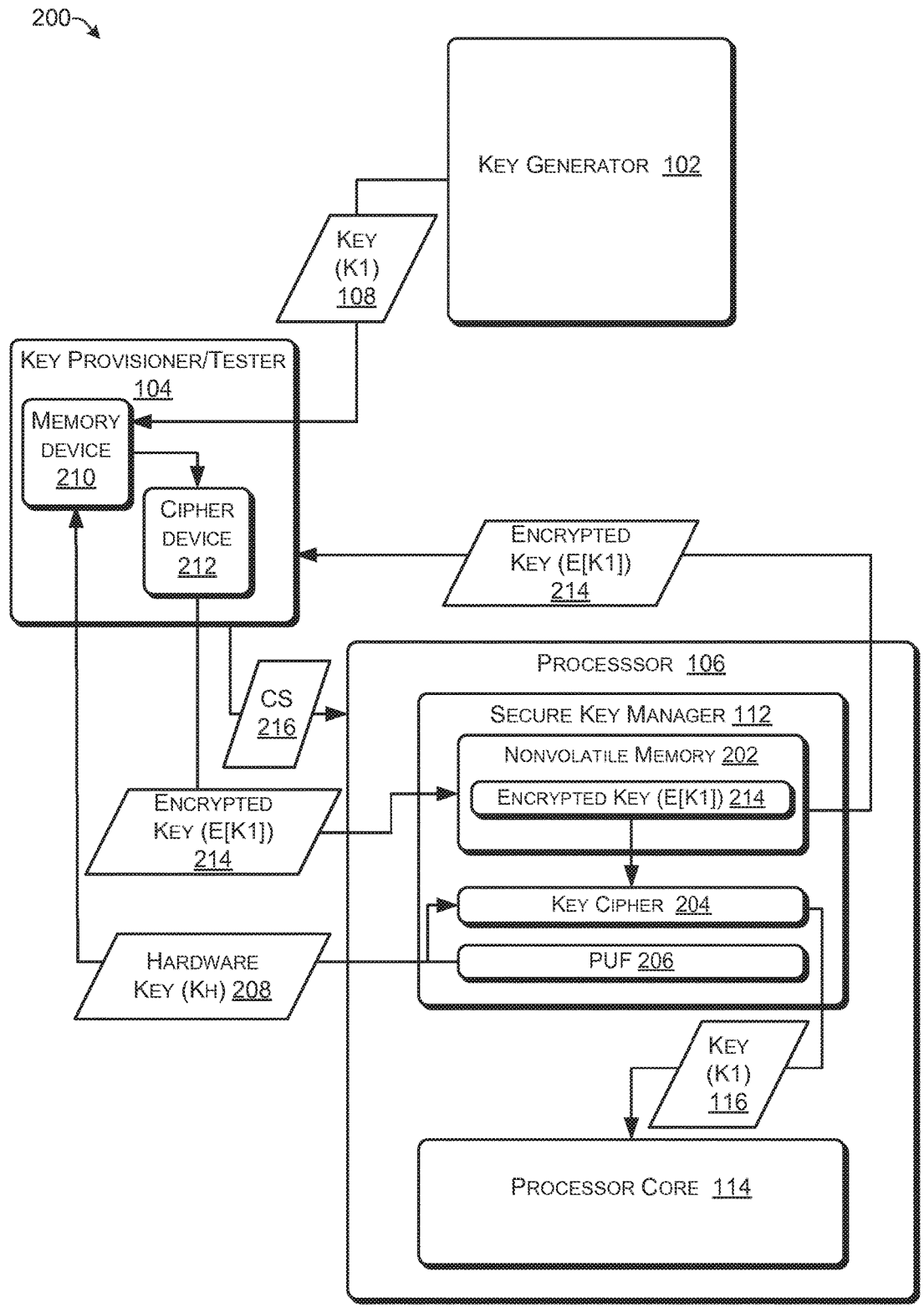
FIG. 2 illustrates another exemplary key-provisioning environment for provisioning keys to processors according to some implementations.

FIG. 2 illustrates an exemplary key-provisioning environment 200 for provisioning keys to processors.

The secure key manager component 112 of the processor 106 may—include nonvolatile memory 202, key cipher component 204, and a physically unclonable functions (PUF) component 206. The non-volatile memory 202 may include programmable read-only memory (PROM), field programmable read-only memory (FPROM) and/or one-time-programmable nonvolatile memory (OTP VIM). The nonvolatile memory 202 may include metal fuses and/or anti-fuses of CMOS (complimentary metal-oxide-semiconductor) fabricated cells, and the fuses (and/or anti-fuses) may be selectively blown or destroyed to program the nonvolatile memory 202.

The key cipher component 204 may be a decryption component and may be a hardware only component. For example, the key cipher component 204 may be fixed logic circuitry for providing cipher functions and may include one or more of dedicated circuits, logic units, microcode, or the like. The key cipher component 204 may employ symmetric-key algorithms such as, but not limited to, Twofish, Serpent, Advanced Encryption Standard (AES), Blowfish, CAST5, CAST-128, RC4, Data Encryption Standard (DES), 'Triple DES (3DES), and International Data Encryption Algorithm (IDEA).

The PUF component 206 may be a hardware only component that generates a unique hardware key (KH) 208 based on one or more physical characteristics of the processor 106. For example, the PUF component 206 may be fixed logic circuitry and may include one or more of dedicated circuits, logic units, microcode, or the like. The one or more physical characteristics of the processor 106 may be due to manufacturing variations, which may be uncontrollable, that may be a result of integrated circuit fabrication of the processor 106. For example, integrated circuits that are of the same design may have timing differences due to manufacturing variations of parameters such as dopant concentration and widths. The PUF component 206 may measure temporal response of various components of the processor 106 and may generate the hardware key (KH) 208 based at least on the measured temporal responses. The PUF component 206 may provide the key-provisioner/tester 104 and the key cipher component 204 with the hardware key (KH) 208.

The key-provisioner/tester 104 receives the key (K1) 108 from the key generator 102 and the hardware key (KH) 208 from the processor 106. The key-provisioner/tester 104 may include a memory device 210 and a cipher device 212. The key (K1) 108 and the hardware key (KH) 208 may be stored, at least temporarily, in the memory device 210. The cipher device 212 may include an encryption module and a decryption module. The cipher device 212 may employ symmetric-key algorithms such as, but not limited to, Twofish, Serpent, Advanced Encryption Standard (AES), Blowfish, CAST5, CAST-128, RC4, Data Encryption Standard (DES), Triple DES (3DES) and International Data Encryption Algorithm (IDEA).

The cipher device 212 may encrypt the key (K1) 108 with the hardware key (KH) 208 to generate an encrypted key (E[K1]) 214. The key-provisioner/tester 104 may provide the encrypted key (E[K1]) 214 and control signals 216 to store the encrypted key (E[K1]) 214 into the nonvolatile memory 202.

After the encrypted key (E[K1]) 214 is stored in the nonvolatile memory 202, the key-provisioner/tester 104 may read the nonvolatile memory 202 to retrieve the stored encrypted key (E[K1]) 214. The cipher device 212 may decrypt the encrypted key (E[K1]) 214 retrieved from the nonvolatile memory 202 with the hardware key (KH) 208 to recover the key (K1) 108. The key-provisioner/tester 104 may compare the recovered key (K1) 108 against a copy of the key (K1) 108 retrieved from memory device 210. Based at least on the comparison, the key-provisioner/tester 104 may validate the processor 106. If the recovered key (K1) 108 and the copy of the key (K1) 108 received from memory device 210 are not the same, the key-provisioner/tester 104 may fail to validate the processor 106.

The secure key manager component 112 protects the integrity of key (K1) 108. The secure key manager component 112 may protect the integrity of key (K1) 108 by not retaining a copy of the key (K1) 108. Thus, a physical attack on the secure key manager component 112 to read the key (K1) 108 will fail. In addition the secure key manager component 112 may protect the integrity of key (K1) 108 by not retaining a copy of the hardware key (KH) 208. Thus, an attacker cannot read the hardware key (KH) 208 from secure key manager component 112 and, consequently, cannot access the hardware key (KH) 208 to decrypt the encrypted key (E[K1]) 214. Physical attacks on the processor 106 may result in changes in the physical characteristics of the processor 106. In some embodiments, changes in the physical characteristics of the processor 106 may cause the PUF component 206 to no longer generate a valid copy of the hardware key (KH) 208 that can be used to decrypt the encrypted key (E[K1]) 214. Rather, the PUF component 206 may, as a consequence of the physical changes to the processor 106, generate a different version of the hardware key (KH) 208 that cannot be used to decrypt the encrypted key (E[K1]) 214.

During validation and/or final testing, of the processor 106, the key-provisioner/tester 104 may isolate the secure key manager component 112 from communications with de-vices/entities that are external to the processor 106. The key-provisioner/tester 104 may blow fuses and/or anti-fuses of the processor 106 and/or set internal flags/bits that communicatively isolate the secure key manager component 112 from external devices/entities. In some embodiments, the secure key manager component 112 may communicate only with processor core 114.

In the flow diagrams of FIGS. 3, 5, 6 and 7, each block may represent one or more operations that may be implemented in hardware, firmware, software, or a combination thereof. However, in some embodiments, some blocks may represent one or more operations that may be implemented only in hardware, and in yet other embodiments, some blocks may represent one or more operations that may be implemented only in hardware or firmware. In the context of hardware, the blocks may represent hardware-based logic that is executable by the secure key manager component 112 to perform the recited operations. In the context of software or firmware, the blocks may represent computer-executable instructions that, when executed by a processor, cause the processor to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 500, 600 and 700 or FIGS. 3, 5, 6 and 7, respectively, are described with reference to one or more of the key-provisioning environments 200, as described above, and 400, as described below, although other models, systems and environments may the used to implement these processes.

Figure 3:
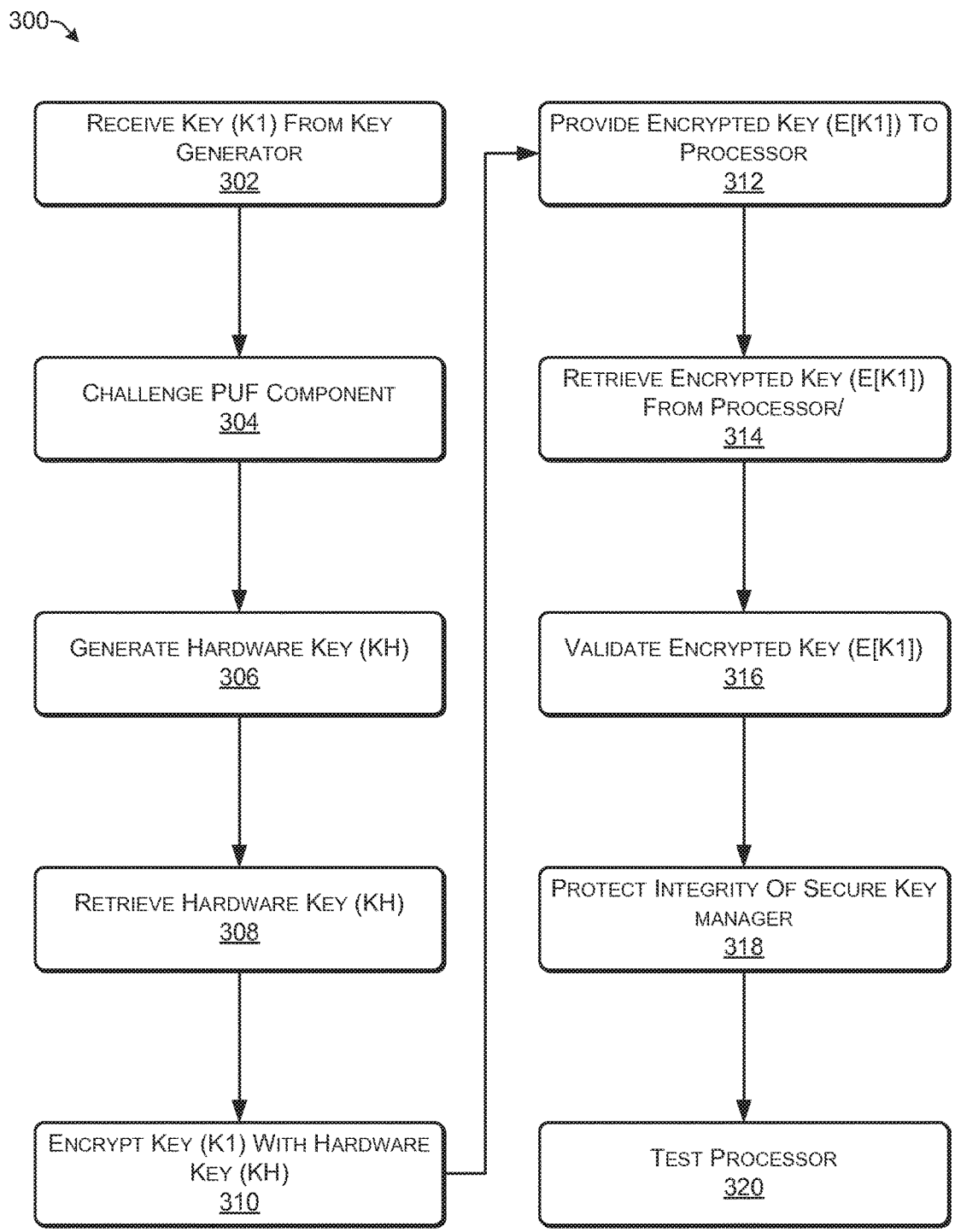
FIG. 3 illustrates a flow diagram of an exemplary process that includes provisioning a processor with a key according to some implementations.

FIG. 3 illustrates a flu diagram of an exemplary process 300 that includes provisioning the processor 106 with a key (K1) 108. The process 400 may be performed by the key-provisioner/tester 104 and the secure key manager component 112.

At 302, the key-provisioner/tester 104 may receive the key (K1) 108 from the key generator 102. In some embodiments, the key-provisioner/tester 104 may store, at least temporarily, the received key (K1) 108 in memory device 210. The key-provisioner/tester 104 may delete the key (K1) 108 from the memory device 206 after successful validation of the processor 106 or after successful validation of a number of processors 106, e.g., after a production run of processors 106.

At 304, the key-provisioner/tester 104 may challenge the PUF component 206 via control signals 216.

At 306, the PUF component 206 may generate the hardware key (KH) 208 in response to the challenge from the key-provisioner/tester 104.

At 308, the key-provisioner/tester 104 may retrieve the hardware key (KH) 208 from the processor 106. In some embodiments, the key-provisioner/tester 104 may read the hardware key (KH) 208 from the secure key manager component 112, and in other embodiments, the key-provisioner/tester 104 may read the hardware key (KH) 208 from the nonvolatile memory 202. In some embodiments, the key-provisioner/tester 104 may store, at least temporarily, the read the hardware key (KH) 208 in memory device 210. The key-provisioner/tester 104 may delete the hardware key (KH) 208 from the memory device 206 after successful validation of the processor 106 so that no other entity may acquire the hardware key (KH) 208.

At 310, the key-provisioner/tester 104 may encrypt the key (K1) 108 with the hardware key (KH) 208. The encryption of the key (K1) 108 with the hardware key (KH) 208 generates the encrypted key (E[K1]) 214.

At 312, the key-provisioner/tester 104 may provide the encrypted key—(E[K1]) 214 to the processor 106 in some embodiments, the key-provisioner/tester 104 may write the encrypted key (E[K1]) 214 into the nonvolatile memory 202. In some embodiments, the key-provisioner/tester 104 may program the encrypted key (E[K1]) 214 into the nonvolatile memory 202 via control signals 216. In some embodiments, the key-provisioner/tester 104 may blow fuses (or anti-fuses) of the nonvolatile memory 202 via the control signals 216 to store, write, or program the encrypted key (E[K1]) 214 into the nonvolatile memory 202.

At 314, the key-provisioner/tester 104 may retrieve the encrypted key (E[K1]) 214 from the processor 106. In some embodiments, the key-provisioner/tester 104 may retrieve the encrypted key (E[K1]) 214 from the processor 106 by signaling, via control signals '16, the processor 106, and the processor 106 may provide the encrypted key (E[K1]) 214 to the key-provisioner/tester 104. In some embodiments, the key-provisioner/tester 104 may signal, via control signals 216, the secure key manager component 112, and the secure key manager component 112 may provide the encrypted key (E[K1]) 214 to the key-provisioner/tester 104. In some embodiments, the key-provisioner/tester 104 may read the encrypted key (E[K1]) 214 from the nonvolatile memory 202.

At 316, the key-provisioner/tester 104 may validate the encrypted key (E[K1]) 214. The key-provisioner/tester 104 may decrypt the retrieved encrypted key (E[K1]) 214 with the hardware key (KH) 208. In some embodiments, the key-provisioner/tester 104 may retrieve the hardware key (KH) 208 from the memory device 210. In other embodiments, the key-provisioner/tester 104 may retrieve the hardware key (KH) 208 from the processor 106. In some embodiments, the key-provisioner tester 104 may read the hardware key (KH) 208 from the nonvolatile memory 202. The decryption of the encrypted key (E[K1]) recovers the key (K1) 108. The key-provisioner/tester 104 may compare the recovered key (K1) 108 with a known valid version of the key (K1) 108. The known valid version of the key (K1) 108 may be a copy retrieved from the memory-device 210 or a copy received from the key generator 102. The key-provisioner/tester 104 may validate the encrypted key (E[K1]) 214 if the known valid version of the key (K1) 108 and the, recovered key (K1) 108 are the same.

At 318, the key-provisioner/tester 104 may protect the integrity of the secure key manager component 112. The key-provisioner/tester 104 may provide control signals 216 that isolate the secure key manager component 112 from sources/devices that are external to the processor 106. For example, the, key-provisioner/tester 104 may signal a component of the processor 106 to prevent external access to the secure key manager component 112. The key-provisioner/tester 104 may blow fuses, or anti-fuses, of the processor 106 to prevent external access to the secure key manager component 112. In some embodiments, the key-provisioner/tester 104 may prevent external access to the PUF component 206 while permitting external access to at least one other component of the secure key manager component 112.

In some embodiments, the hardware key (KH) 208 is not written into the nonvolatile memory 202 or other memory of the processor 106. The PUF component 206 may generate the hardware key (KH) 208 each time that the key cipher component 204 requires the key hardware key (KH) 208. The key-provisioner/tester 104 may protect the integrity of the secure key manager component by preventing external access to the PUF component 206, even if other components of the secure key manager component 112 are externally accessible. Because the hardware key (KH) 208 is not written into the nonvolatile memory 202 or other memory of the processor 106, an attempt to read the hardware key (KH) 208 from the processor 106 will be unsuccessful after the key-provisioner/tester 104 protects the integrity of the secure key manager component 112.

At 320, the key-provisioner/tester 104 may complete testing of the processor 106. Upon the processor 106 passing tests by the key-provisioner/tester 104, the key-provisioner/tester 104 may validate the processor 106.

Internal Key Encryption

Figure 4:
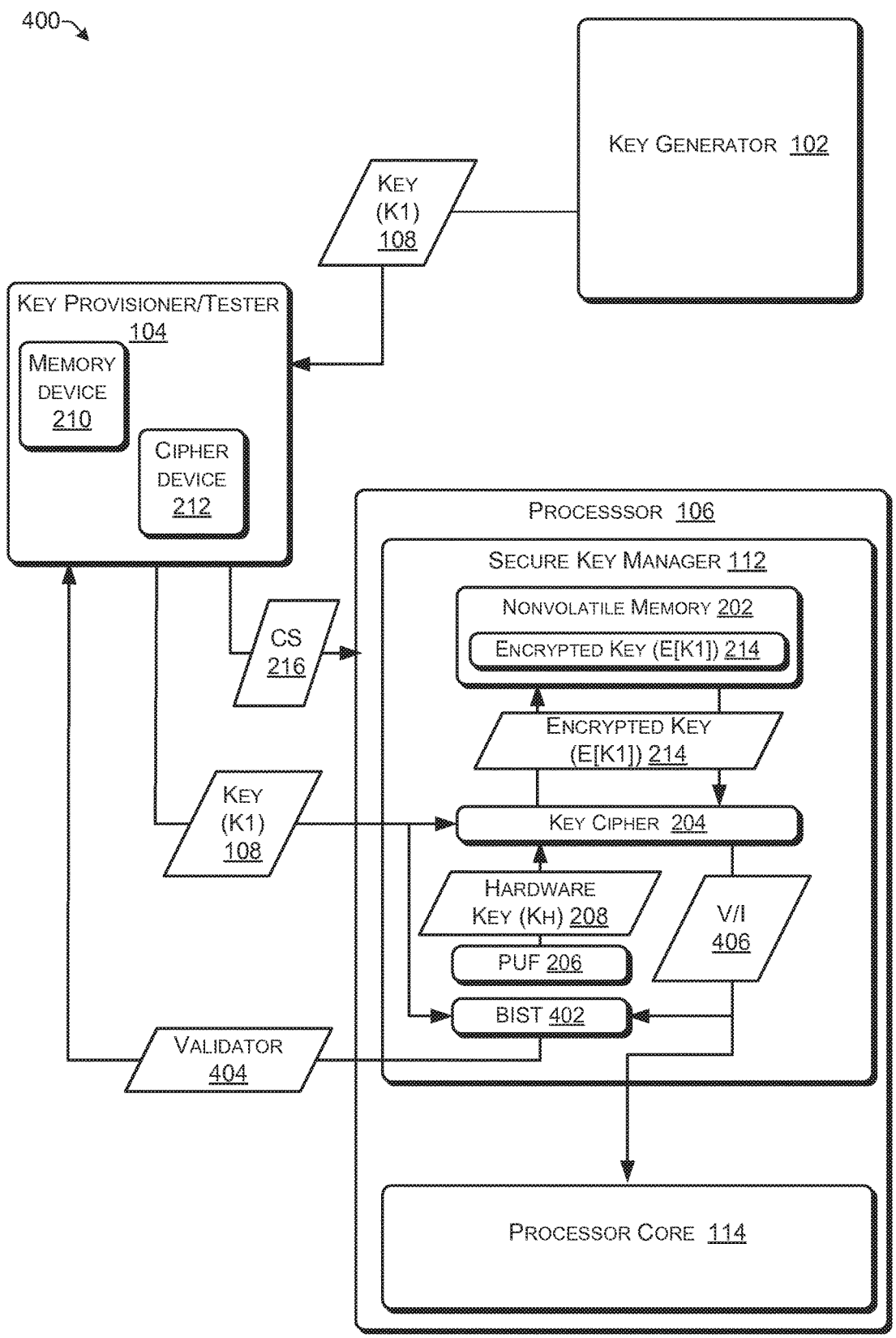
FIG. 4 illustrates another exemplary key-provisioning environment for provisioning keys to processors according to some implementations.

FIG. 4 illustrates an exemplary key-provisioning environment 400 for provisioning keys to processors. In this embodiment, the security of the hardware key (KH) 208 may be further enhanced by not providing the hardware key (KH) 208 to the key-provisioner/tester 104 or to any entity, component, or device that is external to the processor 106. The processor 106 may the manufactured such that the hardware key (KH) 208 is not distributed, nor accessible from, outside of the processor 106.

The secure key manager component 112 of the processor 106 may include nonvolatile memory 202, key cipher component 204, and a physically unclonable functions (PUF) component 206, and a built-in self-tester (B1ST) component 402.

The key cipher component 204 may be an encryption and decryption component and may be a hardware only component. The key cipher component 204 may employ symmetric-key algorithms such as, but not limited to, Twofish, Serpent, Advanced Encryption Standard (AES), Blowfish, CAST5, CAST-128, RC4, Data Encryption Standard (DES), Triple DES (3DES), and International Data Encryption Algorithm (IDEA).

The PUF component 206 may be a physical component that generates the unique hardware key (KH) 208 based on one or more physical characteristics of the processor 106. The PUF component 206 may provide the key cipher component 204 with the hardware key (KH) 208. The PUF component 206 may be isolated from external devices/entities such as the key-provisioner/tester 104. The isolation of the PUP component 206 from external devices/entities may prevent the hardware key (KH) 208 from being distributed, or accessible from outside of the processor 106.

The BIST component 402 may check the validity of the, encrypted key (E[K]) 214 and may provide the key-provisioner/tester 104 with validator 404. The BIST component 402 may be fixed logic circuitry for performing at least some of the operations discussed herein a d may include one or more of dedicated circuits, logic units, microcode, or the like. Validator 404 may provide an indication of whether or not the encrypted key (E[K1]) 214 is valid. For example, the validator 404 may include a flag (e.g., 1/0) indicating that the encrypted key (E[K1]) 214 is valid or invalid (e.g., 1=valid, 0=invalid). As another example, the, validator 404 may include content, such as a ciphertext, from which the key-provisioner/tester 104 may determine whether the encrypted key (E[K1]) 214 is valid or invalid.

The key-provisioner/tester 104 receives the key (K1) 108 from the key generator 102. In some embodiments, the key-provisioner/tester 104 may store, at least temporarily, the key (K1) 108 in the memory device 210. The key-provisioner/tester 104 may provide the key (K1) 108 and control signals 216 to the processor 106 to store the encrypted key (E[K1]) 214 into the nonvolatile memory 202. In some embodiments, the key-provisioner/tester 104 may provide the key (K1) 108 to the key cipher component 204 and may provide the key (K1) 108 to the B1ST component 402.

The control signals 216 may instruct the processor 106 to generate the encrypted key encrypted key (E[K1]) 214 and store the encrypted key encrypted key (E[K1]) 214 in the nonvolatile memory 202. The control signals 216 may cause the PUF component 206 to generate the hardware key (KH) 208. The key cipher component 204 receives the key (K1) 108 and the hardware key (KH) 208. The key cipher component 204 may employ a symmetric cipher algorithm to encrypt the key (K1) 108 with the hardware key (KH) 208, thereby generating the encrypted key (E[K1]) 214. The encrypted key (E[KI]) 214 is stored in the nonvolatile memory 202.

The control signals 216 may instruct the processor 116 to validate the encrypted key encrypted key (E[K1]) 214. The stored encrypted key (E[K1]) 214 may be retrieved from the nonvolatile memory 202 and provided to the key cipher component 204. The key cipher component 204 may employ decrypt the encrypted key (EIK.11): 214 with the hardware key (K1H1) 208 thereby revealing a purported copy of the key (K1) 108. The B1ST component 402 may receive a validation indicator (V/I) 406 and the key (K1) 108.

In some embodiments, the validation indicator 406 may be a key that is purportedly the same as the key (K1) 108. The BIST component 402 may compare the key 108 and the validation indicator 406. If the validation indicator 406 and the key (K1) 108 are the same, the BIST component 402 may validate the encrypted key (E[K1]) 214. The B1ST component 402 may generate the validator 404, which indicates whether the encrypted key (E[K1]) 214 is valid or invalid, and may provide the validator 404 to the key-provisioner/tester 104.

In some embodiments, the validation indicator 406 may be a ciphertext generated by key cipher component 204. The key cipher component 204 may encrypt data which is known by the key-provisioner/tester 104, with the revealed purported copy of the copy of the key (K1) 108, thereby generating the ciphertext. The BIST component 402 may include at least a portion of the ciphertext in the validator 404. The cipher device 212 of the key-provisioner/tester 104 may encrypt the known data with the key (K1) 108, thereby generating reference cipher text. The key-provisioner/tester 104 may compare at least a portion of the reference ciphertext with validator 404 and determine whether the encrypted key (E[K1]) 214 is valid or invalid.

In some embodiments, the validation indicator 406 may be data/text generated by the key cipher component 204. The key cipher component 204 may decrypt ciphertext, which is known by the key-provisioner/tester 104, with the revealed purported copy of the copy of the key—(K1) 108, thereby generating the data/text. The BIST component 402 may include at least a portion of the data/text in the validator 404. The cipher device 212 of the key-provisioner/tester 104 may compare at least a portion of the data/text included in the validator 404 with the known reference data/text and determine whether the encrypted key (E[K1]) 214 is valid or invalid.

In some embodiments, the validation indicator 406 may be a hash value. The key cipher component 204 may perform a hash function, which is known by the key-provisioner/tester 104, on the revealed purported copy of the key (K1) 108, thereby generating recognizable content. The BIST component 402 may include at least a portion of the hash value in the validator 404. The cipher device 212 of the key-provisioner/tester 104 generates a reference hash value by performing the same hash function on the key—(K1) 108 and comparing the reference hash value with the hash value in the validator 406.

Figure 5:
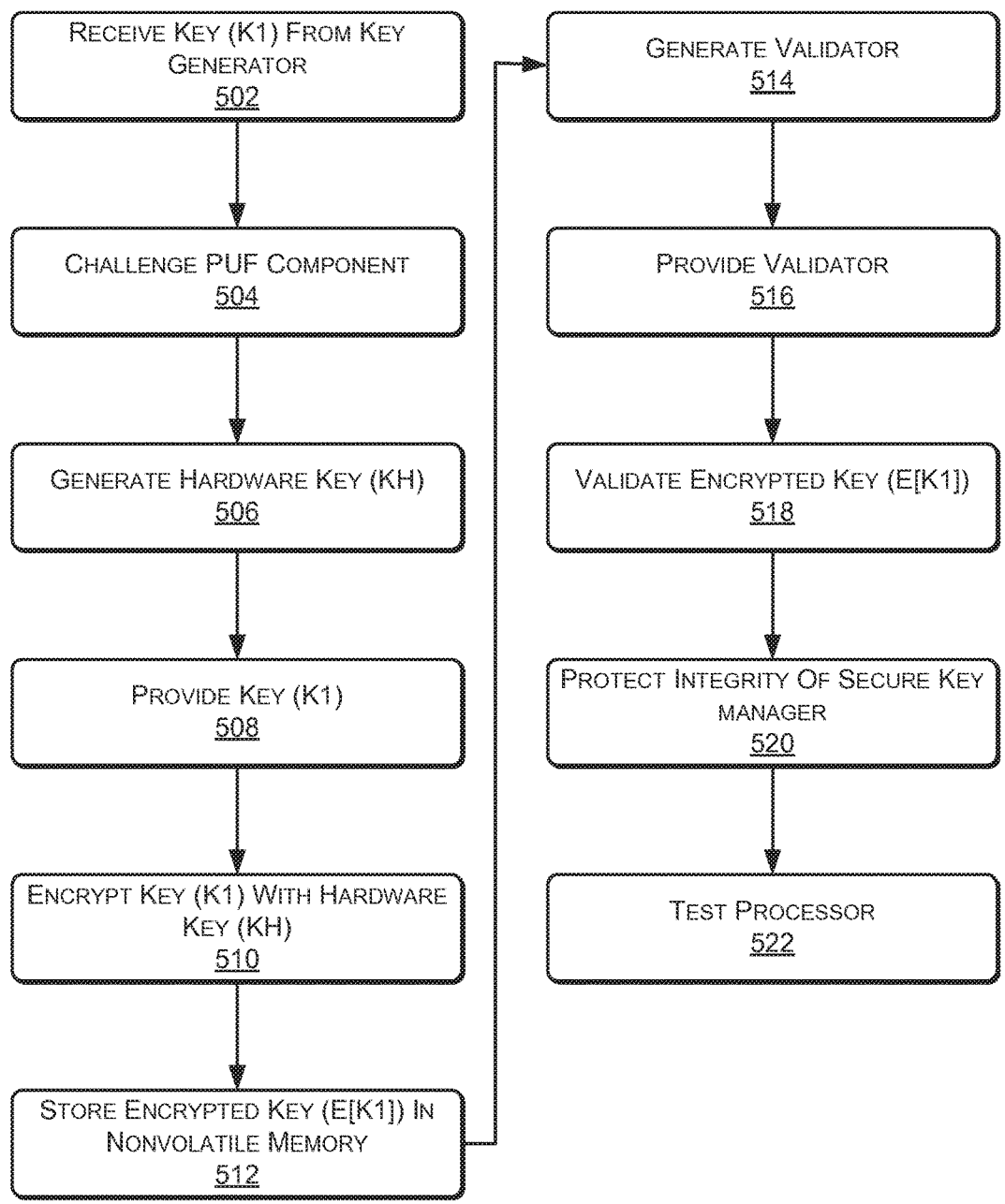
FIG. 5 illustrates a flow diagram of another exemplary process that includes provisioning a processor with a key according to some implementations.

FIG. 5 illustrates a flu diagram of an exemplary process 500 that includes provisioning the processor 106 with a key (K1) 108. The process 500 may be performed by the key-provisioner/tester 104 and the secure key manager component 112.

At 502, the key-provisioner/tester 104 may receive the key (K) 108 from the key generator 102. In some embodiments, the key-provisioner/tester 104 may store, at least temporarily, the received key (K1) 108 in memory device 210. In other embodiments, the received key (K1) 108 is not stored in memory device 210.

At 504, the key-provisioner/tester 104 may challenge the PUF component 206 via control signals 216.

At 506, the PUF component 206 may generate the hardware key (KH) 208 in—response to the challenge from the key-provisioner/tester 104.

At 508, the key-provisioner/tester 104 may provide the key (K1) 108 to the processor 106. In some embodiments, the key-provisioner/tester 104 may provide the key (K1) 108 to the secure key manager component 112, and in other embodiments, the key-provisioner/tester 104 may provide the key (K1) 108 to the key cipher component 204.

At 510, the key cipher component 204 may encrypt the key (K1) 108 with the hardware key (KH) 208. The encryption of the key (K1) 108 with the hardware key (KH) 208 generates the encrypted key (E[K1]) 214.

At 512, the encrypted key (E[K1]) 214 may be stored in the nonvolatile memory 202. The key-provisioner/tester 104 may provide control signals 216 that permit the encrypted key (E[K1]) 214 to be written or programmed into the nonvolatile memory 202. The control signals 216 may permit fuses (or anti-fuses) of the nonvolatile memory 202 to be blown.

At 514, the BIST component 402 generates the validator 404.

At 516, the validator 404 may be provided to the key-provisioner/tester 104. In some embodiments, the key-provisioner/tester 104 may read the validator 404 from the BIST component 402. In other embodiments, the processor 106 may transmit the validator 404 to the key-provisioner/tester 104.

At 518, the key-provisioner/tester 104 may validate the encrypted key (E[K1]) 214 based at least in part on the validator 404. In some embodiments, the validator 404 may include a flag (e.g., 1/0) indicating that the encrypted key (E[K1]) 214 is valid or invalid (e.g., 1=valid, 0=invalid). In other embodiments, the validator 404 may include recognizable content, which is recognizable to the key-provisioner/tester 104, and the key-provisioner/tester 104 may— validate the encrypted key (E[K1]) 214 based at least in part on the recognizable content. For example, the recognizable content may be ciphertext that the key-provisioner/tester 104 may decrypt with the key (K1) 108 or may be data/text that the key-provisioner/tester 104 may compare with reference data/text or may be a hash value that the key-provisioner/tester 104 may compare with a reference hash value (e.g., the key-provisioner/tester 104 may generate the reference hash value based at least in part on the key (K1) 1018), or may be a portion of a key that is purportedly the same as the key (K1) 108.

At 520, the key-provisioner/tester 104 may protect the integrity of the secure key manager component 112. The key-provisioner/tester 104 may provide control signals 216 that isolate the secure key manager component 112 from sources/devices that are external to the processor 106. For example, the key provisioner/tester 104 may signal a component of the processor 106 to prevent external access to the secure key manager component 112. The key-provisioner/tester 104 may blow fuses, or anti-fuses, of the processor 106 to prevent external access to the secure key manager component 112.

In some embodiments, the hardware key (KH) 208 is not written into the nonvolatile memory 202 or other memory of the processor 106. The PUF component 206 may generate the hardware key (KH) 208 each time that the key cipher component 204 requires the key hardware key (KH) 208. The key-provisioner/tester 104 may protect the integrity of the secure key manager component 112 by preventing external access to the PUF component 206, even if other components of the secure key manager component 112 are externally accessible. Because the hardware key (KH) 208 is not written into the nonvolatile memory 202 or other memory of the processor 106, an attempt to read the hardware key (KH) 208 from the processor 106 will be unsuccessful after the key-provisioner/tester 104 protects the integrity of the secure key manager component 112.

At 522 the key-provisioner/tester 104 may complete testing of the processor 106. Upon the processor 106 passing tests by the key-provisioner/tester 104, key-provisioner/tester 104 may validate the processor 106.

Figure 6:
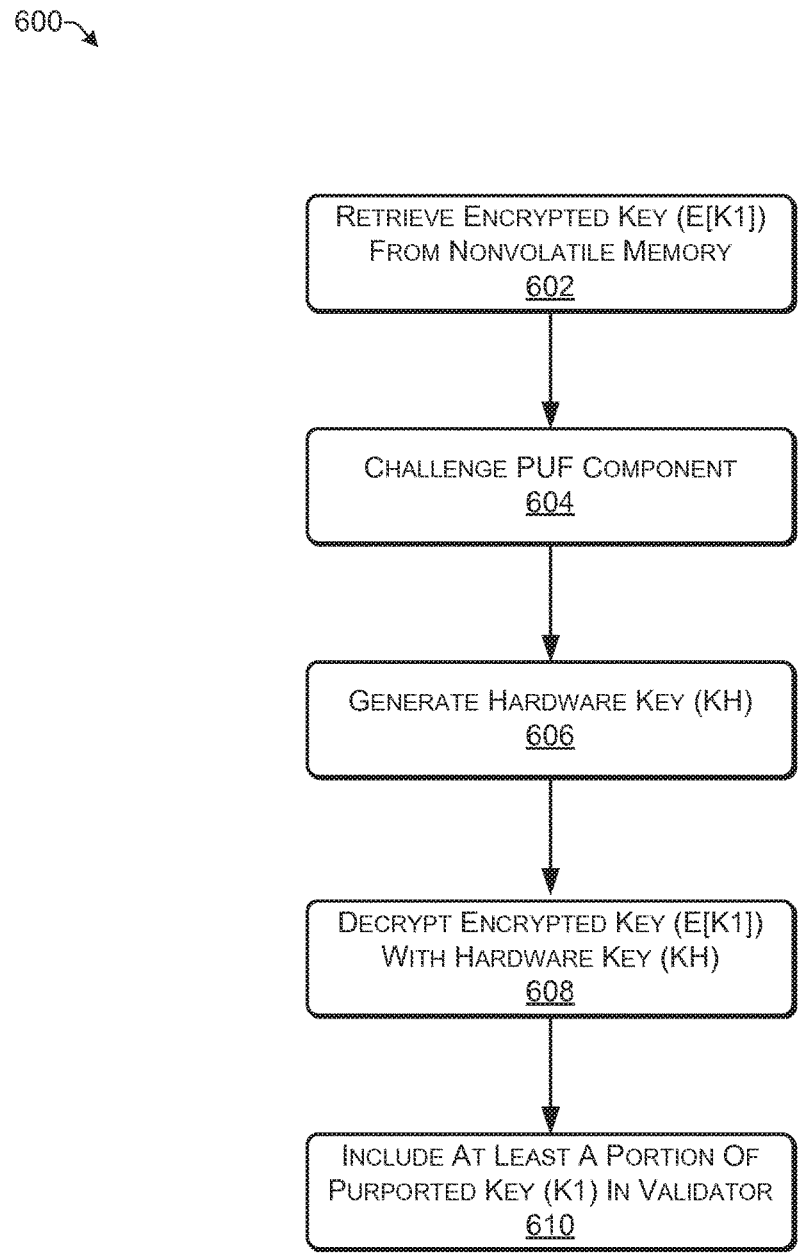
FIG. 6 illustrates a flow-diagram of an exemplary process that includes generating a validator according to some implementations.

FIG. 6 illustrates a flow diagram of an exemplary process 600 for generating the validator 404. The process 500 may be performed by the key-provisioner/tester 104 and the secure key manager component 112.

At 602, the encrypted key (E[K1]) 214 may be retrieved from the nonvolatile memory 202.

At 604, the key-provisioner/tester 104 may challenge the PUF component 206 via control signals 216.

At 606, the PUF component 206 may generate the hardware key (KH) 208 in response to the challenge from the key-provisioner/tester 104.

At 608, the, key cipher component 204 may decrypt the retrieved encrypted key (E[K1]) 214 with the hardware key (KH) 208. The decryption of the encrypted key (E[K1]) 214 with the hardware key (KH) 208 reveals a key that s purportedly the same as the key (K1) 108.

At 610 at least a portion of the key that is purportedly the same as the key (K1) 108 may be included in the validator 404.

Figure 7:
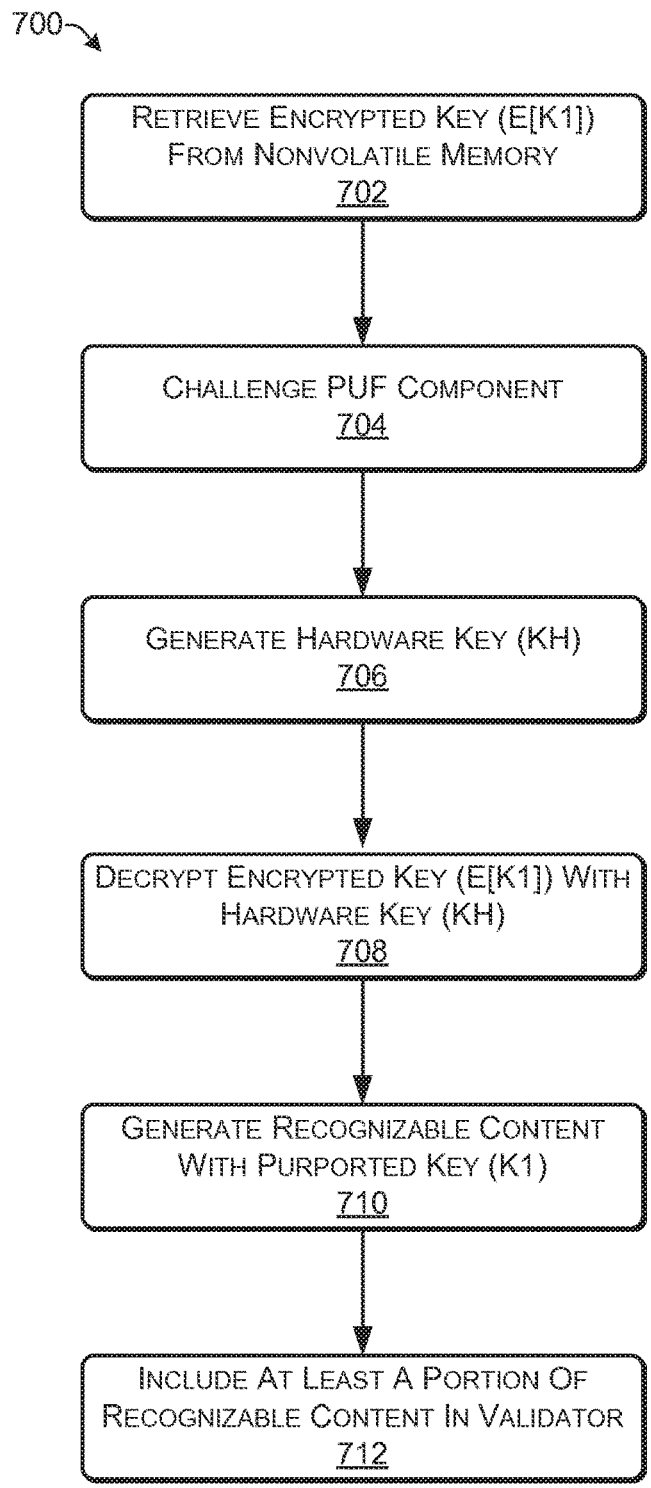
FIG. 7 illustrates a flow diagram of another exemplary process that includes generating a validator according to some implementations.

FIG. 7 illustrates a flow diagram of another exemplary process 700 for generating the validator 404. The process 700 may be performed by the key-provisioner/tester 104 and the secure key manager component 112.

At 702, the encrypted key (E[K1]) 214 may be retrieved from the nonvolatile memory 202.

At 704, the key-provisioner/tester 104 may challenge the PUF component 206 via control signals 216.

At 706, the PUF component 206 may generate the hardware key (KH) 208 in response to the challenge from the key-provisioner/tester 104.

At 708, the key cipher component 204 may decrypt the retrieved encrypted key (E[K1]) 214 with the hardware key (KH) 208. The decryption of the encrypted key (E[K1]) 214 with the hardware key (KH) 208 reveals a key that is purportedly the same as the key (K1) 108.

At 710, the key cipher component 204 may generate recognizable content i.e., content that is recognizable to the key-provisioner/tester/provisioner 104. The key cipher component 204 may encrypt data, which is known by the key-provisioner/tester 104, with the revealed purported copy of the key (K1) 108, thereby generating ciphertext recognizable to the key-provisioner/tester 104. The key cipher component 204 may decrypt ciphertext, which is known by the key-provisioner/tester 104, with the revealed purported copy of the, key (K1) 108, thereby generating text recognizable to the key-provisioner/tester 104. The key cipher component 204 may perform a hash function, which is known by the key-provisioner/tester 104, on the revealed purported copy of the key (K1) 108, thereby generating recognizable content. The, key cipher component 204 may provide a portion of the revealed purported copy of the key (K1) 108, thereby generating recognizable content.

At 712, the BIST component 402 may include at least a portion of the recognizable content in the validator 404.

Exemplary Architecture

Figure 8:
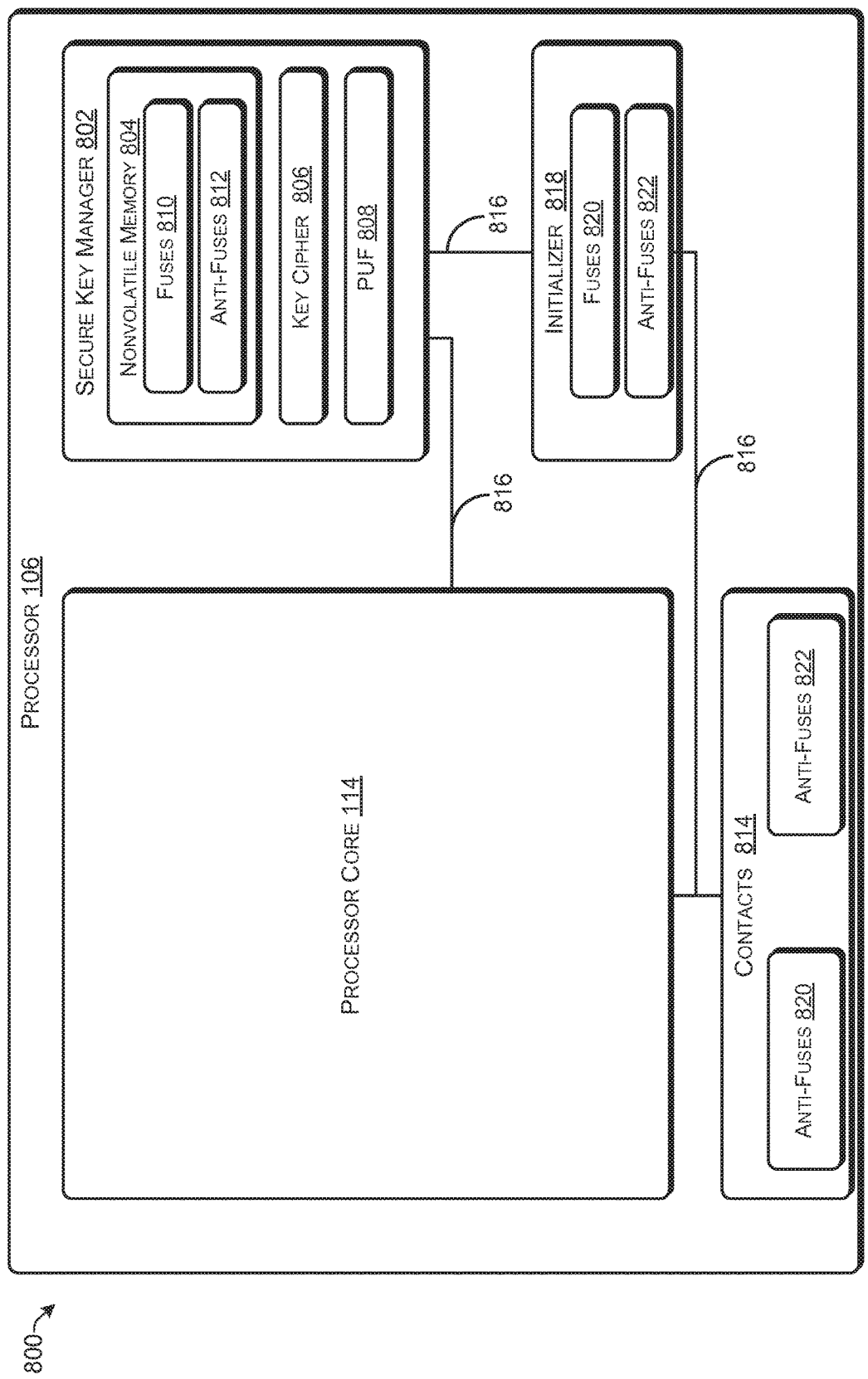
FIG. 8 illustrates an exemplary architecture of a processor having a secure key manager component according to some implementations.

FIG. 8 illustrates an exemplary architecture 800 of the processor 102 having a secure key manager component 802. The secure key manager component 802 may include nonvolatile memory 804, key cipher component 806 and PUF component 808. The non-volatile memory 804 may include fuses 810 and/or anti-fuses 812. In some embodiments, the encrypted key (E[K1]) 214 may be written/programmed into the nonvolatile memory 804 by blowing fuses 810 and/or anti-fuses 812.

In some embodiments, the secure key manager component 802, the nonvolatile memory 804, the key cipher component 806 and the PUF component 808 may be the same as, or similar to, the secure key manager component 112, the nonvolatile memory 202, the key cipher component 204 and the PUF component 206.

The processor 106 may include contacts 814, interconnects 816 and an initializer component 818. The initializer component 818 may be fixed logic circuitry for performing at least some of the operations discussed herein and may include one or more of dedicated circuits, logic units, microcode, or the like. The contacts 814 provides electrical connectivity with external devices, and the interconnects 816 provide electrical connectivity with internal components of the processor 106.

The key-provisioner/tester 104 provides the initializer component 818 with control signals 216 in testing and/or validating the—processor 106. The initializer component 818 may respond to the control signals 216 to test and validate components of the processor 106. The key-provisioner/tester 104 may interface with the initializer component 818 to provision the processor 106 with the key (K1) 108. The operations of the initializer component 818 can be implemented in hardware, firmware, software, or a combination thereof. In some embodiments, the key-provisioner/tester 104 may set flags and/or bits in the initializer component 818 that communicatively isolate the, secure key manager component 802 from external devices. Typically, the key-provisioner/tester 104 may set such flags and/or bits during final testing/validation of the processor 106.

In some embodiments, the contacts 814 arid/or initializer component 818 may include fuses 820 and/or anti-fuses 822. The key-provisioner/tester 104 may—blow fuses 820 and/or anti-fuses 822 that communicatively isolate the secure key manager component 802 from external devices. For example, the key-provisioner/tester 104 may blow fuses 820 and/or anti-fuses 822 of the initializer component 818, which may then prevent the initializer cornpone R18 from further communications with the secure key manager component 802. As another example, the key-provisioner/tester 104 may blow fuses 820 and/or anti-fuses 822 of the contacts 814, which may isolate the interconnect 816a from contacts 814. Typically, the key-provisioner/tester 104 may blow fuses 820 and/or anti-fuses 822 during final testing/validation of the processor 106.

Figure 9:
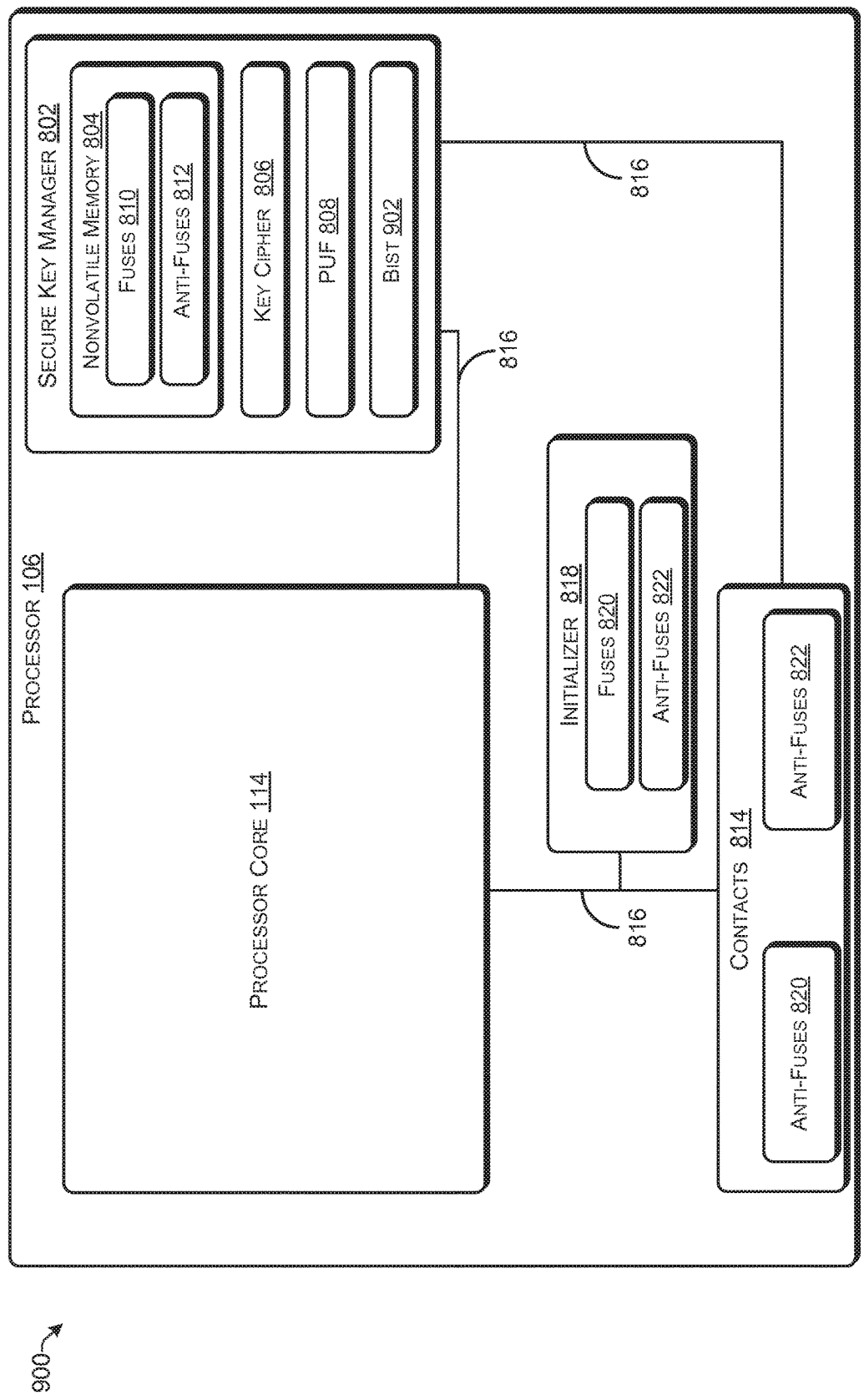
FIG. 9 illustrates another exemplary architecture of a processor having a secure key manager component according to some implementations.

FIG. 9 illustrates another exemplary architecture 900 of the, processor 102 having the secure key manager component 802. The secure key manager component 802 may include BIST component 902. The BIST component 902 may check the validity of the encrypted key (E[K1]) 214 and may provide the key-provisioner/tester 104 with validator 404.

In some embodiments, the secure key manager component 802, the nonvolatile, memory 804, the key cipher component 806, the PUF component 808, and the BIST component 902 may be the same as secure key manager component 112, the nonvolatile memory 202, the key cipher component 204, the PUF component 206 and BIST component 402.

The exemplary environments and architectures described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may, be implemented by a computer program product.

Furthermore this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure or characteristic described is included in at least one implementation, and the appearances of these-phrases in various places in the specification are not necessarily all referring to the same implementation.

Illustrative System

Figure 10:
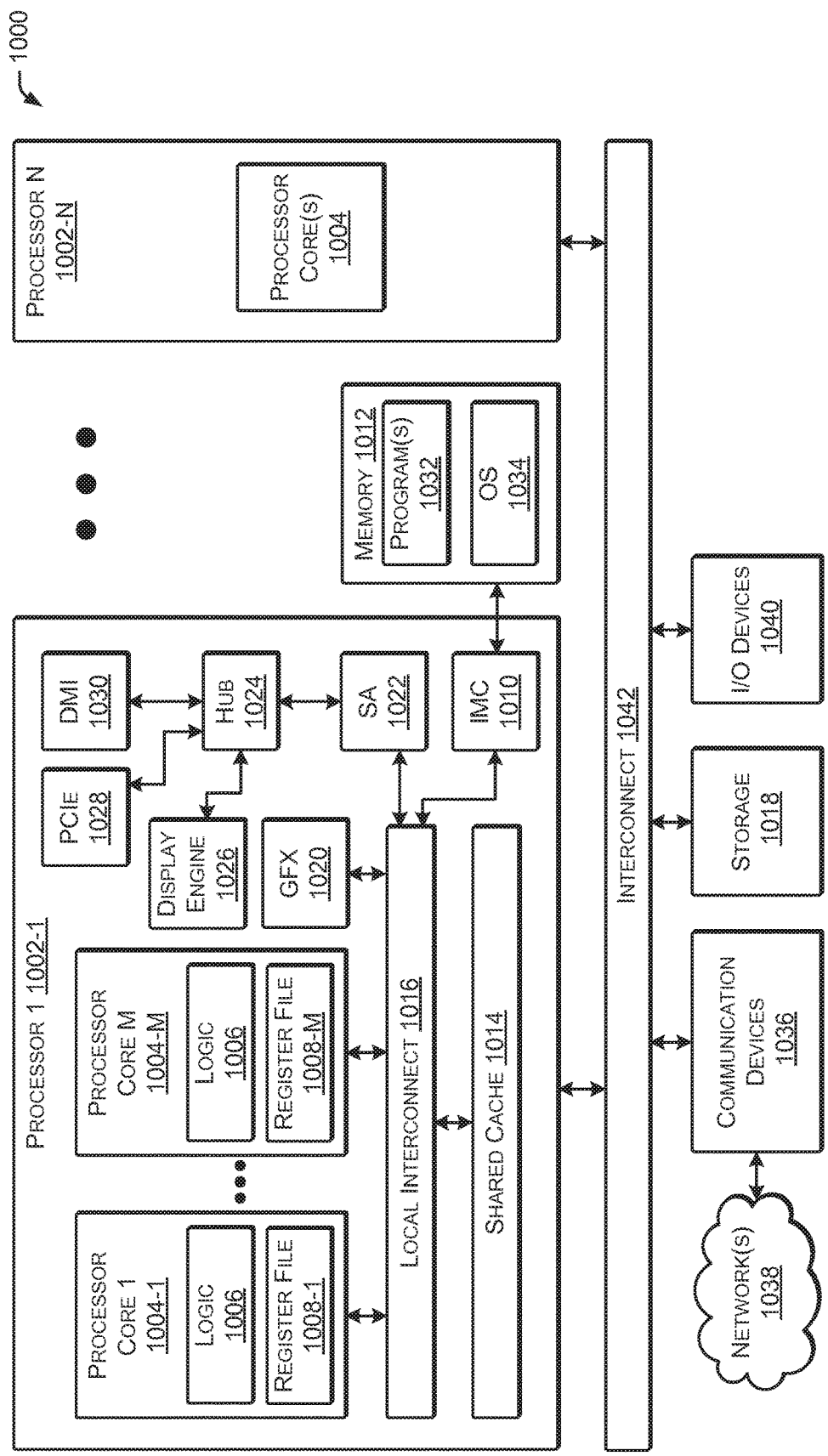
FIG. 10 is a block diagram of an illustrative architecture of a system provisioned with a key.

FIG. 10 is a block diagram of an illustrative architecture of a system provisioned with a key. The system 1000 may include one or more processors 1002-1, . . . , 1002-N (where N is a positive integer ≥1), each of which may include one or more processor cores 1004-1, . . . , 1004-M (where M is a positive integer ≥1). In some implementations, as discussed above, the processor(s) 1002 may be a single core processor, while in other implementations, the processor(s) 1002 may have a large number of processor cores, each of which may include some or all of the components illustrated in FIG. 10. For example, each processor core 1004-1, . . . , 1004-M may include an instance of logic 1006 for interacting with a register file 1008-1, . . . , 1008-M and/or performing at least some of the operations discussed herein. The logic 1006 may include one or more of dedicated circuits, logic units, microcode, or the like.

The processor(s) 1002 and processor core(s) 1004 can be operated, via an integrated memory controller (IMC) 1010 in connection with a local interconnect 1016, to read and write to a memory 1012. The processor(s) 1002 and processor core(s) 1004 can also execute computer-readable instructions stored in the memory 1012 or other computer-readable media. The memory 1012 may include volatile and nonvolatile memory and/or removable and non-removable media implemented in any-type of technology for storage of information, such as computer-readable instructions, data structures, program modules or other data. Such memory may include, but is not limited to, RAM, ROM, EEPROM, flash memory or other memory technology. In the case in which there are multiple processor cores 1004, in some implementations, the multiple processor cores 1004 may share a shared cache 1014, which may be accessible via the local interconnect 1016.

Additionally, storage 1018 may be provided for storing data, code, programs, logs, and the like. The storage 1018 may be accessible via an interconnect 1042 and may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 1000, the memory 1012 and/or the storage 1018 may be a type of computer readable storage media and may be a non-transitory media.

In various embodiments, the local interconnect 1016 may also communicate with a graphical controller (GIFX) 1020 to provide graphics processing. In some embodiments, the local interconnect 1016 may communicate with a system agent 1022. The system agent 1022 may be in communication with a hub 1024, which connects a display engine 1026, a PCIe 1028, and a DMI 1030.

The memory 1012 may store functional components that are exe able by the processor(s) 1002. In some implementations, these functional components comprise instructions or programs 1032 that are executable by the processor(s) 1002. The example functional components illustrated in FIG. 10 further include an operating system (OS) 1034 to manage operation of the system 1000.

The system 1000 may include one or more communication devices 1036 that may accessible via the interconnect 1042, and the communication devices 136 may include one or more interfaces and hardware components for enabling communication with various other devices over a communication link, such as one, or more networks 1038. For example, communication devices 1036 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating such networks are well known and will not be discussed herein in detail.

The system 1000 may further be equipped with various input/output (I/O) devices 1040 that may be accessible via the interconnect 1042. Such I/0 devices 1040 may include a display, various user interface controls (e.g., buttons, joystick, keyboard, touch screen, etc.), audio speakers, connection ports and so forth. An interconnect 1024, which may include a system bus, point-to-point interfaces, a chipset, or other suitable connections and components may be provided to enable communication between the processors 1002, the memory 1012, the storage 1018, the communication devices 1036, and the I/0 devices 1040.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A method of provisioning a key to a processor, comprising:
   receiving a first key from a key generator component that is external to the processor;
   receiving a unique hardware key generated by a first logic of the processor, wherein the hardware key is based on at least one manufacturing variation of the processor;
   encrypting the first key with the unique hardware key at a device that is external to the processor to generate an encrypted first key;
   storing the encrypted first key in nonvolatile memory of the processor;
   detecting whether the stored encrypted first key is valid, wherein the detecting comprises reading the encrypted first key from the nonvolatile memory, decrypting the encrypted first key with the unique hardware key to reveal a purported first key, and comparing the purported first key to the first key; and
   isolating at least one of the first logic and the nonvolatile memory of the processor from all sources that are external to the processor in response to detecting that the stored encrypted first key is valid.

2. A method as recited in claim 1, wherein storing the encrypted first key in the nonvolatile memory of the processor comprises:
   writing, by the device that is external to the processor, the encrypted first key into the nonvolatile memory.

3. A method as recited in claim 2, wherein, when detecting whether the stored encrypted first key is valid, a device that is external to the processor performs the reading the encrypted first key from the nonvolatile memory, and the decrypting the read encrypted first key with the hardware key to reveal the purported first key; and wherein the method further comprises:
   employing at least a portion of the purported first key in the detecting of whether the stored encrypted first key is valid.

4. A method as recited in claim 2, wherein the isolating at least one of the first logic and the nonvolatile memory of the processor from all sources that are external to the processor comprises:
   providing control signals, by a device that is external to the processor, to the processor; and
   permanently disabling at least one communication path in response to the control signal.

5. A method as recited in claim 1, wherein:
   the first logic of the processor generates the unique hardware key in response to external control signals provided by a device that is external to the processor; and
   receiving the unique hardware key generated by the first logic of the processor comprises receiving the unique hardware key at a second logic that is internal to the processor.

6. A method as recited in claim 5, wherein, when detecting whether the stored encrypted first key is valid, the second logic that is internal to the processor performs the reading the encrypted first key from the nonvolatile memory, and the decrypting the read encrypted first key with the hardware key to reveal the purported first key; and wherein the method further comprises:
   generating, within the processor, a validator that indicates whether the encrypted first key is valid or invalid based at least in part on at least a portion of the purported first key; and
   providing the validator to a device that is external to the processor.

7. A method as recited in claim 5, wherein the isolating at least one of the first logic and the nonvolatile memory of the processor from all sources that are external to the processor comprises:
   providing, by a device that is external to the processor, a control signal to the processor; and
   permanently disabling at least one communication path in response to the control signal.

8. An apparatus comprising:
   a memory device external to a processor, the memory device to receive a unique hardware key generated by a first logic of the processor, wherein the unique hardware key is based on at least one manufacturing variation of the processor, and to receive a first key from a key generator component that is external to the processor; and
   a cipher device external to the processor and coupled to the memory device, the cipher device to encrypt the first key with the unique hardware key to generate an encrypted first key, store the encrypted first key in nonvolatile memory of the processor, detect whether the stored encrypted first key is valid, wherein to detect whether the stored encrypted key is valid, the cipher device to read the encrypted first key from the nonvolatile memory, decrypt the encrypted first key with the unique hardware key to reveal a purported first key, and compare the purported first key to the first key, and to isolate at least one of the first logic and the nonvolatile memory of the processor from all sources that are external to the processor in response to detecting that the stored encrypted first key is valid.

9. An apparatus as recited in claim 8, wherein to store the encrypted first key in the nonvolatile memory of the processor, the cipher device to:
write the encrypted first key into the nonvolatile memory.

10. An apparatus as recited in claim 9, wherein to detect whether the stored encrypted first key is valid, the cipher device to:
employ at least a portion of the purported first key in the detection of whether the stored encrypted first key is valid.

11. An apparatus as recited in claim 9, wherein to isolate at least one of the first logic and the nonvolatile memory of the processor from all sources that are external to the processor, the cipher device to:
provide a control signal to the processor; and
permanently disable at least one communication path in response to the control signal.

12. An apparatus as recited in claim 8, wherein:
the first logic to generate the unique hardware key in response to external control signals provided by the cipher device.

13. An apparatus as recited in claim 12, wherein to receive the unique hardware key generated by the first logic of the processor, the memory device to receive the unique hardware key at a second logic that is internal to the processor.

14. An apparatus as recited in claim 12, wherein to detect whether the stored encrypted first key is valid, the cypher device to:
receive, from the processor, a validator that indicates whether the encrypted first key is valid or invalid based at least in part on at least a portion of the purported first key.

\* \* \* \* \*